United States Patent
Foster, Sr. et al.

(10) Patent No.: US 7,549,034 B2
(45) Date of Patent: Jun. 16, 2009

(54) REDISTRIBUTION OF MEMORY TO REDUCE COMPUTER SYSTEM POWER CONSUMPTION

(75) Inventors: Jimmy Grant Foster, Sr., Morrisville, NC (US); Michael Gerard Brinkman, Raleigh, NC (US); Matthew A. Eckl, Raleigh, NC (US); Kwok Hon Yu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 11/164,125

(22) Filed: Nov. 10, 2005

(65) Prior Publication Data

US 2007/0106860 A1    May 10, 2007

(51) Int. Cl.
   G06F 12/00    (2006.01)
   G06F 1/32     (2006.01)
(52) U.S. Cl. .................... 711/170; 711/105; 713/320
(58) Field of Classification Search ................. 711/170, 711/105; 713/320
   See application file for complete search history.

(56) References Cited

U.S. PATENT DOCUMENTS

| | | | |
|---|---|---|---|
| 4,302,809 A | 11/1981 | Drogichen | |
| 4,935,642 A * | 6/1990 | Obelode et al. | 307/32 |
| 5,691,949 A | 11/1997 | Hively et al. | |
| 6,459,647 B1 | 10/2002 | Kengeri | |
| 6,850,443 B2 * | 2/2005 | Lofgren et al. | 365/185.29 |
| 2003/0023825 A1 | 1/2003 | Woo et al. | |
| 2003/0028711 A1 | 2/2003 | Woo et al. | |
| 2003/0174559 A1 | 9/2003 | Cooper et al. | |
| 2003/0229821 A1 | 12/2003 | Ma | |

* cited by examiner

*Primary Examiner*—Hyung S Sough
*Assistant Examiner*—Mehdi Namazi
(74) *Attorney, Agent, or Firm*—Gerald J. Iwanejko, Jr.; Cynthia S. Byrd-Seal (57) ABSTRACT

A method, apparatus and system are disclosed for redistributing memory allocation to portions of dynamic random access memory (DRAM) and dual in-line memory module (DIMM) devices that are underutilized, in order to balance memory usage more evenly amongst active devices so as to limit the amount of power and the thermal load consumed by an individual memory component. The disclosed method, apparatus and system are capable of identifying and tracking memory usage to minimize power consumption in a way that lessens the detrimental effects of "throttling" or reduced power modes for memory devices.

35 Claims, 4 Drawing Sheets

REDISTRIBUTION OF MEMORY TO REDUCE COMPUTER SYSTEM POWER CONSUMPTION

TECHNICAL FIELD

This invention relates to memory devices within computer systems and to power conservation in such devices and systems.

BACKGROUND

A central processing unit (CPU) is the computing and control hardware element of a computer-based system. In a personal computer (PC), for example, the CPU is usually an integrated part of a single, extremely powerful microprocessor. An operating system (OS) is the software responsible for allocating system resources including memory, processor time, disk space, and peripheral devices such as printers, modems, and monitors. All application programs use the OS and CPU to gain access to these resources as necessary. The OS is the first program loaded into the computer as it boots up, and it remains in memory throughout the computing session.

Advanced CPU's and embedded processors are achieving higher performance as time goes on. However, memory subsystems are requiring lower latency and more bandwidth to sustain performance. For example, dynamic random access memory (DRAM), including that configured into dual in-line memory modules (DIMM), is getting faster in clock speed, wider in data and/or address bus size, and larger in capacity. As a result, DRAM/DIMM memory is consuming more power and generating more heat. The wider bus effectively increases the memory subsystem power consumption linearly, whether it is for embedded appliances, Desktop/Notebook PC's, or high-density server applications. It is possible that a single DRAM and/or DIMM component can be the target of nearly all bus activity and thus consume much more power than other memory components on the same channel.

In many computer systems, the power consumption of DRAM/DIMM memory is insignificant compared to other system components such as hard disks, high-performance microprocessors, active matrix displays, monitors, etc. However, in other computer systems, such as for example in the newly emerging and evolving class of mobile devices known as "handhelds" or "PDAs" ("personal digital assistants"), the power consumption of the memory is significant as compared to other components in the computer system. Also, servers can utilize large arrays of memory with hundreds or thousands of devices where the memory subsystem becomes the dominant consumer of power in the system. As a result of these and other factors, power consumption of memory subsystems has become more of an issue, so there is a strong need to reduce memory power consumption.

Memory devices with power management features are becoming available to address this need. For example, DRAM/DIMM components are available that support various different reduced power modes. However, power savings come at the cost of performance. Typically, a greater penalty in access speed is imposed at each increasing degree of power savings. Thus, decisions regarding whether to invoke power-saving features in memory components should be made intelligently. Typically, it is desired to initiate a low power mode in a particular memory device only when that memory device is not currently in use and is not anticipated to be in use in the near future.

It is difficult, however, to anticipate the future need for accessing any particular region of memory. Furthermore, modern operating systems typically allocate memory without regard to memory device boundaries, making it difficult to find a single memory device that can appropriately be set to a reduced power mode without significantly impacting overall system performance. More specifically, typical memory allocation schemes often result in a highly fragmented memory space, with allocated pages of memory spread more or less randomly across the available range of physical memory. Because allocated memory is normally spread across all of the available devices, none of the devices can be put into a reduced power mode without seriously impacting memory performance.

Certain teachings of the prior art provide a means for performing adaptive memory power management in a system employing a CPU along with a memory subsystem involving DRAM and/or DIMM components. In particular, certain embodiments provide for controlling the periodicity of operation (i.e. "throttling") of the CPU and/or memory by monitoring actual processes of the CPU and memory subsystem from one time segment to another, and determining which portions of the memory subsystem to power down for at least the next time segment based on whether the CPU and the monitored memory processes are to be active during that time segment. This has the advantage of reducing memory component power and cooling at the system level but can only protect an individual component with an unacceptable reduction in system performance.

Other teachings of the prior art describe memory power conservation using specific techniques for minimizing the number of actual DRAM/DIMM devices being used in a system at any particular time. In one such prior art embodiment, the memory controller can identify highly used portions of the logical and/or virtual memory address space by monitoring memory instructions in order to keep track of which addresses are specified most frequently and/or most recently in the memory instructions. In this way, the memory controller is configured to periodically re-map the logical and/or virtual address space to physical memory in order to reduce the number of physical memory devices accessed by the highly-used portions of that address space. Specifically, the address translation entries are periodically re-calculated so that the most frequently and/or recently used logical and/or virtual memory addresses map to physical memory that is located in the fewest possible number of physical memory devices or ranks. Depending on system constraints which set the maximum power consumption of the memory system, the most frequently and/or recently used addresses can be mapped to devices that are the most active and thus consume more power and have the highest performance. Conversely, addresses that are used less frequently and/or less recently can be mapped to devices that are less active and thus consume less power and have lower performance. In conjunction with this re-mapping process, memory content is copied or moved as appropriate so that all logical and/or virtual memory addresses will continue to reference the same data even though the data might now be in a different physical location.

However, these types of prior art systems suffer from the disadvantages inherent with such "throttling" and reduced power modes, which typically affect an entire DRAM/DIMM memory device or multiple ranks within a device (or in certain cases even more than one device) rather than impacting individual cells or rows within such memory devices. In these cases, system performance may be compromised if a memory instruction is not executed correctly due to "throttling" or reduced power operation when memory access is requested by the CPU.

These problems are solved by the apparatus and methods of the present invention, which identify and track memory usage to minimize power consumption in a way that lessens the detrimental effects of "throttling" or reduced power modes, by redistributing memory allocation to portions of DRAM/DIMM devices that are underutilized in order to balance memory usage more evenly among active devices.

Further, because the prior art implements memory "throttling" and/or remapping the memory address space in a way that reduces the total number of physical memory devices being utilized in order to lessen power consumption, these prior art systems teach away from the present invention by requiring consolidation of memory use, rather than even redistribution of memory allocation to accomplish power conservation while also minimizing the need for "throttling" or reduced power operation.

SUMMARY OF THE INVENTION

In order to perform efficient adaptive memory power management in a system employing a CPU along with a memory subsystem involving DRAM/DIMM components, it is desirable to know the states of operation of the CPU and of various memory-related functions, in order to most effectively reduce power consumption for portions of the memory subsystem without compromising system performance. For example, if it is not known when operation of the CPU may be restored from a powered down (or idle) state, then it is not known when the CPU may issue any additional read/write instructions to memory. If this is the case, it may not be possible to efficiently minimize memory power consumption by "throttling" or by operating portions of memory at reduced power, because system data processing performance may be jeopardized through failure to properly execute a memory instruction if the CPU requests access when the memory is powered down.

Accordingly, the present invention resolves such problems by redistributing memory allocation more evenly among memory devices in order to limit the amount of power (and thus the thermal load) consumed by an individual memory component. Specifically, the present invention dynamically redistributes the active memory address space to prevent any memory component from holding a disproportionate share of the stored data or instructions currently in use, by moving part of the memory contents into a spare region of memory. This is accomplished by requiring the CPU, OS and/or memory system to hold a region of active memory storage in reserve, either by retaining a spare memory component or by not fully utilizing an active memory component. By operating the CPU, OS and/or memory controller in such a way as to track memory usage, power and/or thermal loads for each memory component, the memory controller can redistribute or reallocate a portion of the memory contents by copying (or "writing") it into a free or reserved section of memory. These contents can subsequently be accessed from the new memory location if the memory activity is unbalanced and/or if a single memory component sustains a disproportionate share of the power or thermal load over a period of time, thus balancing the workload and lowering the peak thermal profile.

Traditional methods of "throttling" or reduced power memory operation can be briefly applied until the redistribution has occurred, and each active DRAM/DIMM component can have a region of memory reserved for this purpose. For systems with spare memory, the reallocated address space can be redistributed back to the remaining functional components if one or more of the memory components becomes faulty, and the system can revert to "throttling" or reduced power operation if necessary until the faulty component is repaired or replaced. Thus, the present invention is applicable to a memory power management system with multiple DRAM/DIMM components in a channel and also to systems with spare components or other types of memory.

It is therefore an object of the present invention to overcome the disadvantages of the prior art by identifying and tracking memory usage to minimize power consumption in a way that lessens the detrimental effects of "throttling" or reduced power modes.

It is another object of the present invention to overcome the disadvantages of the prior art by redistributing memory allocation to portions of DRAM/DIMM devices that are underutilized in order to balance memory usage more evenly amongst active devices.

It is another object of the present invention to overcome the disadvantages of the prior art by redistributing memory allocation more evenly among memory devices in order to limit the amount of power and the thermal load consumed by an individual memory component.

It is another object of the present invention to overcome the disadvantages of the prior art by dynamically redistributing the active memory address space to prevent any memory component from holding a disproportionate share of the stored data or instructions currently in use, by moving part of the memory contents into a spare region of memory.

It is another object of the present invention to overcome the disadvantages of the prior art by operating the CPU, OS and/or memory controller to track memory usage, power and/or thermal loads for each memory component, in order to redistribute or reallocate a portion of the memory contents into a free or reserved section of memory if the memory activity is unbalanced and/or if a single memory component sustains a disproportionate share of the power or thermal load over a period of time.

It is another object of the present invention to overcome the disadvantages of the prior art by providing a memory power management system that can be used with multiple DRAM/DIMM components in a channel and also with systems having spare memory components.

The subject matter which is regarded as the invention is particularly pointed out and distinctly claimed in the concluding portion of the specification. The invention, however, together with further objects and advantages thereof, may best be understood by reference to the following description taken in conjunction with the accompanying drawings.

DETAILED DESCRIPTION OF THE PREFERRED EMBODIMENTS

Figure 1:
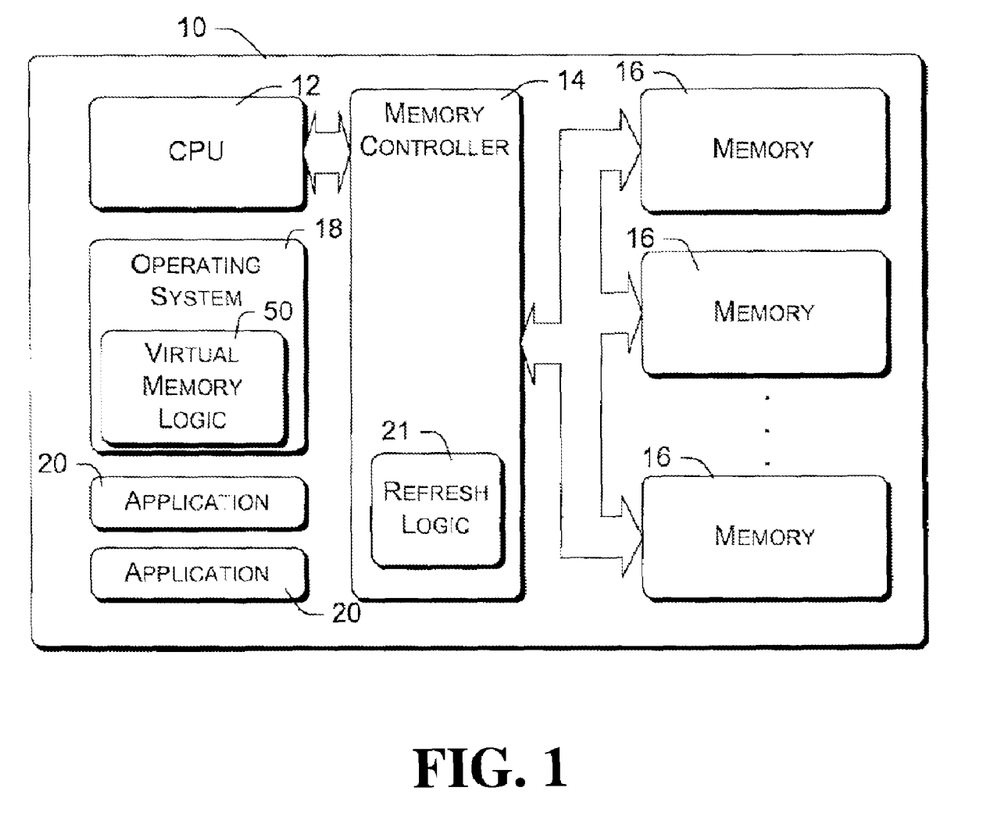
FIG. 1 is a block diagram of a computer system that incorporates aspects of the present invention.

The computer system architecture of FIG. 1 is applicable to the present invention and is typical of many computers and computer-like devices, and is not limited to conventional desktop systems or even to conventional portable or personal computer (PC) systems. Many types of systems, such as entertainment and game devices, industrial control devices, network and internet servers and devices, and others either use an architecture such as this or can be easily adapted to use such an architecture.

I. System Architecture

FIG. 1 shows pertinent portions of a computer system 10, including a central processing unit (CPU) 12 which can be implemented in the form of a microprocessor, an operating system (OS) 18, and a memory system comprising a memory controller (MC) 14 and memory storage devices 16. Although the memory controller and memory storage devices are shown to be separate entities in this figure, the same techniques apply for memory controllers that are integrated into the CPU, as well as memory storage that is integrated with either the controller and/or the CPU.

Memory controller 14 acts as an interface between memory devices 16 and the CPU 12 and OS 18. Memory controller 14 preferably has refresh logic 21 that is configured to periodically renew the contents of individual memory cells of memory devices 16, and address translation logic 50 that correlates "virtual" or "logical" memory addresses with the corresponding "physical" memory addresses representing the actual location(s) of the executed programming instructions and processed data, as they physically reside within memory devices 16. In the described embodiment, memory devices 16 preferably have dynamically refreshable memory cells. Such devices are typically referred to as DRAMs (dynamic random access memory), and can include various types of devices utilizing DRAM technology, such as dual in-line memory modules (DIMM). Other types of memory devices can, however, also benefit from the techniques described herein.

The computer system 10 also preferably includes an operating system (OS) 18 and one or more applications or application programs 20. The operating system and applications are software programs that are often initially stored on some form of non-volatile memory such as a system hard disk drive or compact disk read-only memory (CD-ROM) (not shown). They are subsequently loaded into executable random access memory (RAM) and executed by CPU 12. RAM devices 16 preferably form at least part of the executable memory. The operating system is often off-the-shelf, general-purpose computer software such as Microsoft Windows, UNIX or LINUX that provides hardware management functions and support for application programs. However, the operating system might alternatively be a custom program designed for a particular specialized purpose or for a specific type of computer hardware or software application, and might itself perform the specialized functions that would in other cases be performed by separate application programs. In many cases, the computer system implements a logical or virtual memory system, so that only portions of the operating system and applications are actually present in physical memory at any given time.

II. Memory Architecture

Figure 3:
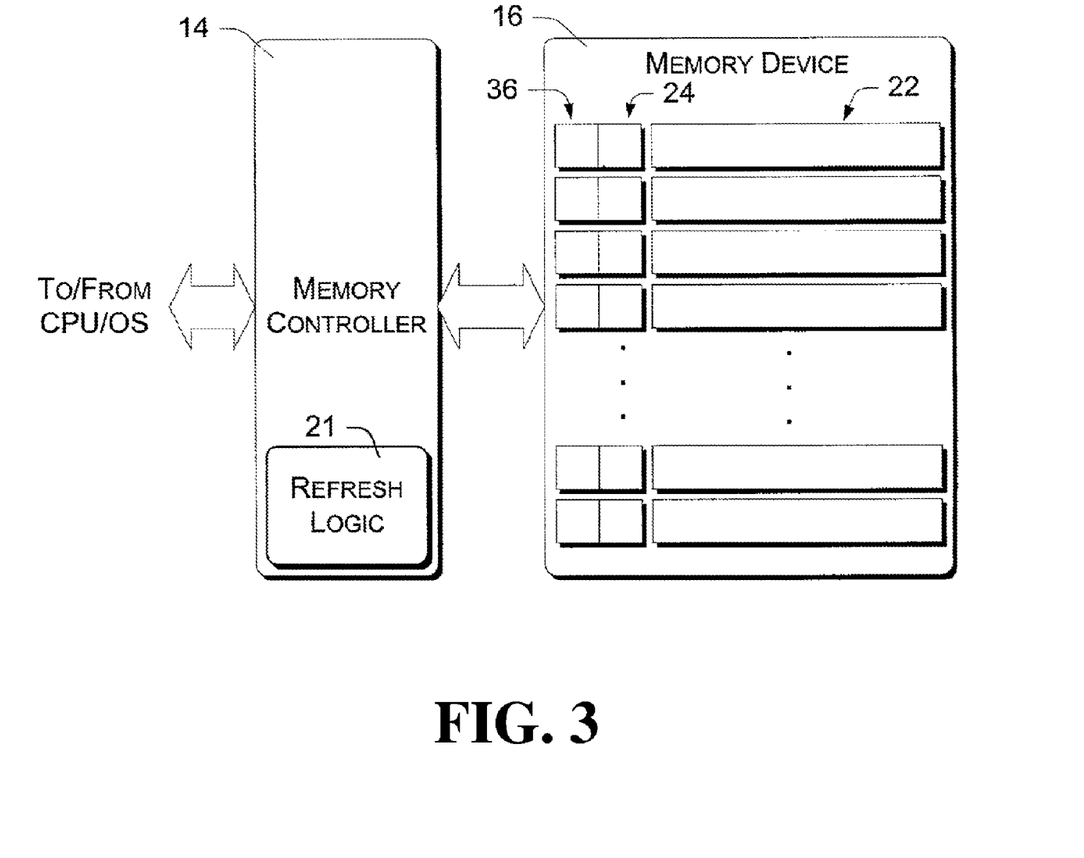
FIG. 3 is a block diagram showing pertinent parts of a memory controller and memory device of the present invention.

FIG. 3 shows a preferred embodiment of a memory system comprising a memory controller 14 and one of memory devices 16 in more detail. In this embodiment, each of memory devices 16 has multiple dynamically refreshable memory (DRAM/DIMM) cells, arranged in rows 22. In operation, memory controller 14 can receive instructions from various sources, including from operating system (OS) 18 through CPU 12, a graphics adapter (not shown), and/or other sources. The memory controller responds to these instructions by performing various memory operations, such as for example, "reads" that ascertain the current contents of a memory location, and "writes" that provide new and/or updated information for storage in a memory location, respectively.

In order to ensure that the binary data in each of the memory cells remains accurate, the contents of the memory cells are periodically renewed in a "refresh" operation. As illustrated by reference to FIG. 3, a refresh operation typically involves reading the contents of a memory row 22 to refresh logic 21 (preferably comprised of sense amplifiers located in memory controller 14) and then writing the same data back to that row 22. Memory controller 14 is often configured to perform periodic refresh cycles on its own without receiving instructions from the CPU 12. In many prior art systems, a refresh operation is performed on every memory cell in each memory row of a memory device at least once during every refresh period. The refresh period has a duration equal to a parameter often referred to as "TREF", and the refresh period is often referred to as the TREF period.

Memory devices 16 are often referred to collectively as "physical" or "primary" memory. Physical memory is characterized by being randomly accessible through the specification of physical memory addresses (or locations): CPU 12 preferably accesses memory devices 16 by identifying physical memory addresses to memory controller 14, through use of instructions from operating system (OS) 18 that are based on requests from an application program 20. The available range physical memory addresses is often referred to as a "physical address space". Because the amount of physical memory is finite, the physical address space is also finite and in some cases is relatively small compared to the needs of the operating system and application programs. In order to provide a larger effective address space, many operating systems implement "virtual" memory 50.

In a virtual memory system, each application program often has available its own "virtual address space" that is typically larger than the physical address space. Each application program typically executes in its own virtual address space. To make each virtual address space appear relatively unlimited, the operating system makes use of a mass storage medium such as a hard disk drive, which is typically referred to as secondary storage or secondary memory to distinguish it from primary or physical memory. Secondary storage is usually relatively slow to access, but normally has a capacity much larger than that of primary memory. The operating system monitors memory usage and when portions of virtual memory are not being used, the data from the corresponding portions of physical memory is moved to secondary storage. Thus, at any given time, some portions of virtual memory will correspond to portions of primary or physical memory, and some virtual memory will correspond to portions of secondary memory.

Figure 2:
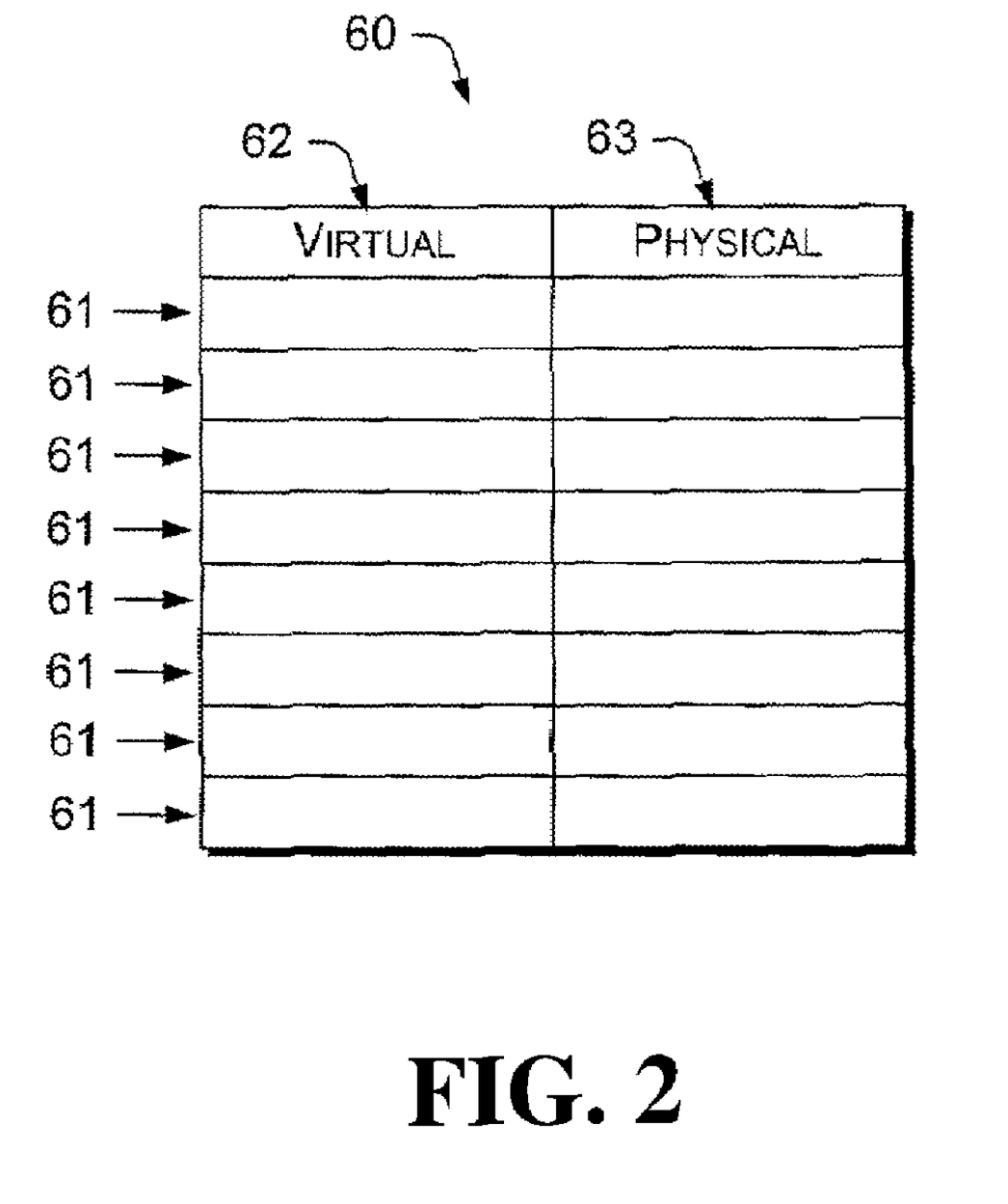
FIG. 2 shows a virtual-to-physical mapping table used in conjunction with the memory system of the present invention.

In systems such as this, the operating system (OS) 18 typically allocates virtual memory 50 to requesting application programs 20. When such virtual memory is allocated, the operating system 18 preferably creates a translation or "mapping" between an allocated range of virtual memory addresses and its corresponding range of physical memory addresses as shown in FIG. 2. Each translation or "mapping" entry 61 correlates a virtual or source address 62 with a physical or target address 63. The operating system 18 preferably maintains an updated translation or "mapping table" 60 that contains all current translations or mappings.

Alternately or in addition to implementing "virtual memory", instructions received by memory controller 14 from CPU 12 often specify addresses in terms of a "logical address space". The "logical address space" represents a variable translation (or "mapping") that occurs between the OS 18 and memory controller 14 through CPU 12 using address translation logic 50, in order to correlate "logical addresses" representing some logical organization of data in memory (such as an individual user file) with the corresponding "physical addresses" where that data actually resides within memory devices 16. In many systems, the "virtual" and "logical" address spaces are equivalent.

III. Memory Operation

As explained above, dynamically refreshed memory, usually referred to as dynamic random access memory or DRAM, including dual in-line memory modules (DIMM), is a type of memory component found in many different computing devices. A typical DRAM/DIMM device may have millions, billions or even more memory cells. A DRAM/DIMM memory cell is commonly formed by a single transistor and an associated capacitance. The capacitance is charged to a voltage that indicates a binary bit value of either digital logic low "0" or digital logic high "1". The capacitance loses its charge rather quickly, bringing about the need for periodic refreshing which in turn causes memory power consumption.

Typical PC systems use either 64-bit or 128-bit DRAM/DIMM subsystems. In the latter case, the memory subsystem is usually operated with two independent 64-bit memory controllers (MC). Various types of DRAM/DIMM may be deactivated (or "powered down") through either a physical power-down signal such as a clock enable (CKE) signal, or through a packetized power-down command sent through a high-speed serial bus. For double data rate (DDR) synchronous DRAM (SDRAM), for example, de-asserting a CKE signal (low) puts the corresponding memory row of the DRAM into a power down state. Asserting the CKE signal (high) brings the memory row back to a full operating state. The CKE signal may be dynamically toggled on every rising and/or falling edge of the SDRAM clock.

A typical 64-bit memory controller (MC) may support between two and four SDRAM dual in-line memory modules (DIMM). Each DIMM has up to two memory rows (each side of a double-sided DIMM is called a memory row) and each memory row may have multiple internal memory banks or ranks. Each bank may comprise multiple memory pages, one page from each DRAM chip of the memory row. Typically, if a MC may put each memory row of multiple DIMM modules independently and dynamically into and out of the power down states using the CKE signal, then the MC is said to support dynamic DRAM power management. However, dynamic memory management is typically supported only in power-sensitive appliances such as notebook PC's or PDA's and is not available for desktop PC's for various reasons.

In many systems and as described and incorporated herein by reference to U.S. Patent Application Publication No. 2003/0229821, the performance of the processor and memory may be altered to conserve power through a defined "throttling" process that controls transitions into multiple CPU and/or memory performance states. In order to accomplish this, an OS may keep track of the percentage of time that the CPU is idle as opposed to operating (i.e., its "duty cycle") and write the percentage value to a register. For example, the CPU may have been idle for about 40% of a last predefined time period. Different operating systems can use different windows of time (or "loops") to compute the duty cycle. Older operating systems have longer idle loops. Newer operating systems have shorter idle loops in order to accommodate as many tasks as possible running simultaneously.

In order to accomplish "throttling", the CPU throttle control signal (THR) can comprise a stop clock signal (STPCLK) that is fed back to a signal input of the CPU. For example, STPCLK may be a digital logic high "1" during a portion of a run-time segment and a digital logic low "0" during another portion of the run-time segment, as defined by the most recent duty cycle calculated for the CPU. When STPCLK is a logic high "1" value, the CPU begins processing and when STPCLK is a logic low "0" value, the CPU stops processing. In this way, the duty cycle of the CPU stop clock signal controls the periodicity of operation (or "throttling") of the CPU on a time-segment-by-time-segment basis, since this duty cycle is adjusted for each run-time segment based on the most recently computed CPU percentage idle value for the last run-time segment. If it is known based on the duty cycle when the CPU is idle then certain memory subsystem(s) may be deactivated to conserve power during those times (i.e., when CPU use is "throttled") as long as there are no pending memory access requests for that subsystem. In this way, it is possible to utilize "throttling" to operate memory cells in high-latency modes that consume less power than normal low-latency modes.

In order to reduce memory power consumption, the operating system can also be configured to notify the memory controller regarding used and unused memory as described and incorporated herein by reference to U.S. Patent Application Publication Nos. 2003/0023825 & 2003/0028711. As indicated above, an operating system typically includes facilities for dynamically allocating and de-allocating memory. When loading an application program, for example, an operating system typically designates specific areas of virtual or logical memory for the instruction code of the application, and specific areas of memory for use by the program in storing data. Allocation and de-allocation typically involve maintaining one or more tables or other data structures indicating those areas of memory that have been designated for use in this manner by "mapping" to their physical memory addresses as described above. Memory allocation can also take place as a result of an application program requesting the use of additional memory during actual execution of the program. In response to requests such as this, the operating system designates additional areas of memory for exclusive use by the requesting application programs.

Regardless of the method of memory allocation, the operating system 18 is preferably configured to identify allocated memory to memory controller 14 through CPU 12 when physical memory is in use. Similarly, the operating system is configured to instruct or notify memory controller that physical memory is de-allocated when it is no longer in use. In order to conserve power, memory controller 14 responds by preferably refreshing currently allocated memory and by omitting the refreshing of memory that is not currently allocated. In one preferred embodiment as shown in FIG. 3, either memory controller 14 or the affected memory device 16 responds by setting or programming use registers 24 and recent-access registers 36 to indicate whether the associated memory rows 22 are currently being used or have recently been accessed, respectively. Use register 24 or recent-access register 36 can be set to a digital logic high "1" (or "true") value if the corresponding row 22 is allocated and currently in use or if it has recently been accessed, respectively. Conversely, these registers can be reset to a digital logic low "0" (or "false") value if the corresponding row 22 is not allocated and is not currently in use or if it has not recently been accessed, respectively. Subsequently, the memory subsystem is responsive to the use registers 24 and recent-access registers 36 to refresh the contents of only those memory rows 22 that are currently being used but have not been recently accessed, in order to minimize power consumption.

Figure 4:
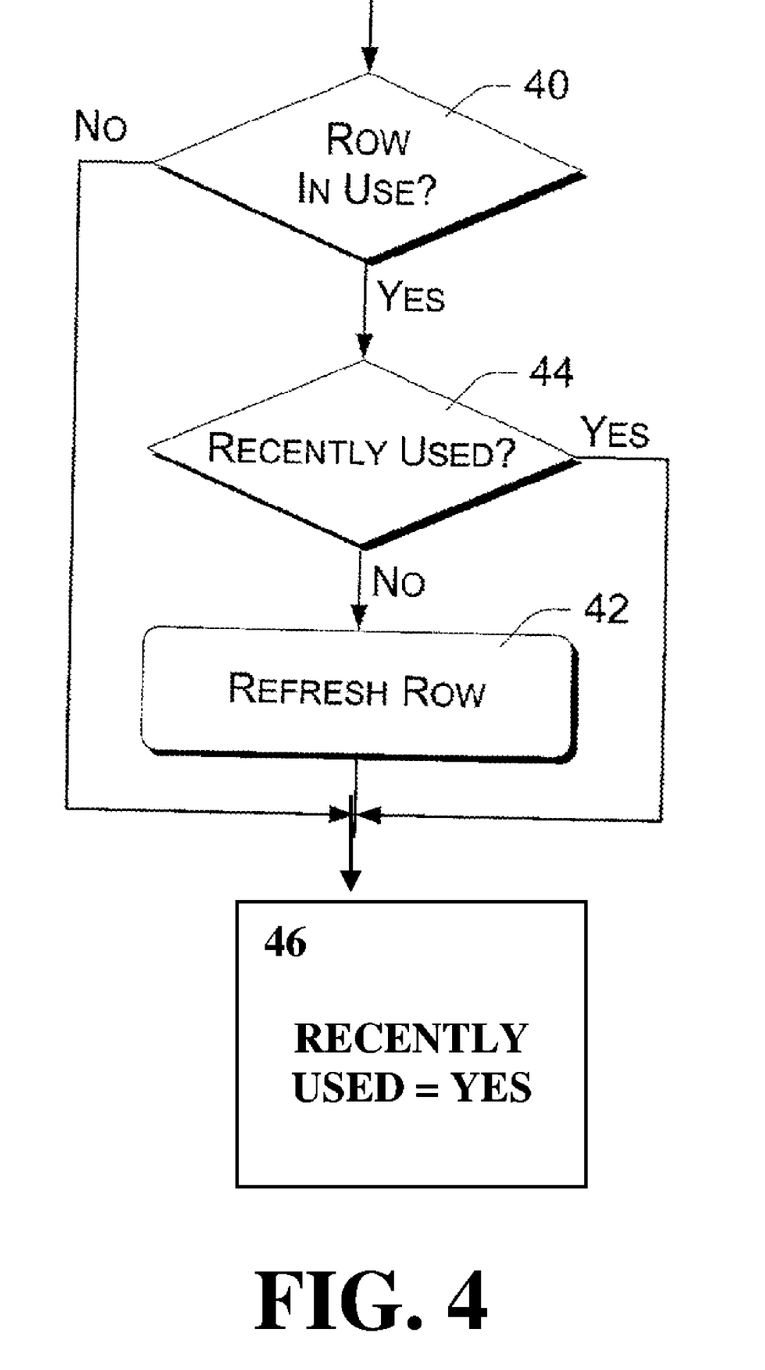
FIG. 4 is a flowchart showing actions performed in the embodiment of FIG. 3 to refresh a memory row in accordance with the present invention.

FIG. 4 shows refreshing actions performed by memory controller 14 with respect to each row 22 of a memory device 16 in accordance with the implementation shown by FIG. 3. These actions can be initiated at least once for every memory row 22 during every refresh period (TREF). Prior to refreshing a row 22, as illustrated by block 40, memory controller 14 accesses the appropriate use register 24 to determine whether the row 22 is currently in use. If the row 22 is not in use, the subsequent refreshing operation 42 is skipped. If the row 22 is in use, an operation 44 accesses the appropriate recent-access register 36 to determine whether the current row has already been refreshed during the previous refresh cycle interval. If that row 22 has already been refreshed during the previous cycle, refreshing operation 42 is skipped. Refreshing 42 is thus performed only if use register 24 is a digital logic high "1" (or "true") value and recent-access register 36 is a digital logic low "0" (or "false") value, indicating that the row 22 is currently in use but has not recently been refreshed. As a concluding operation 46, recent-access register 36 is reset to a digital logic high "1" (or "true") value for the next refresh period to indicate recent refreshing of its corresponding memory row 22.

In this way, use registers 24 and recent-access registers 36 allow power-saving measures to be taken with respect to areas of memory that are not being used. In the illustrated case of DRAM/DIMM memory, these registers allow refreshing of unused memory rows to be omitted. Alternative types of power reduction measures might be available depending on the particular type of memory device being utilized.

IV. Reducing Memory Power Consumption

In order to facilitate memory power conservation, the above-described embodiments include circuits and logic for keeping track of which memory cells or memory areas are currently in use and which ones are not in use. When the memory is dynamically refreshable memory such as DRAM and/or DIMM, a reduction in power consumption can be implemented through the use of "throttling" as described above. Alternately or in conjunction therewith, a reduction in power consumption can be implemented by omitting or skipping refreshing of memory cells or areas as also described above. An added benefit of the latter technique is that refresh operations can be limited to only those memory cells that are storing useful data. By reducing the number of useless refresh operations being performed (which can delay subsequent memory access requests from components such as the CPU), the memory system is available more often for such requests, increasing performance by reducing latency and thus increasing bandwidth. Omitting refreshing of identified, non-used areas of memory can thus provide significant power savings as well as an increase in data processing performance.

By utilizing mapping logic as described above that translates from logical or virtual addresses specified in memory instructions to physical addresses used to access memory devices, memory allocation is performed in a manner that reduces or minimizes the number of physical memory devices or ranks of memory devices that are in use at any given time. After minimizing the number of physical memory devices that are in use, the memory controller sets other memory devices (i.e., those that are either unused or are subject to relatively less usage) to reduced power modes. The actions of "throttling" memory usage and/or identifying and organizing portions of the memory address space based on usage in a manner that reduces the number of physical memory devices being utilized in order to set unused memory devices to reduced power modes has the benefit of reducing power consumption.

However, there are drawbacks to the above-described methods of "throttling" or monitoring memory usage to consolidate in-use memory rows on as few memory devices or memory ranks as possible. Through either technique, memory devices are set to reduced power consumption modes such as standby, nap, or power-down modes. However, such "throttling" and reduced power modes typically affect an entire memory device or ranks within a memory device rather than individual cells or rows within such memory devices, and it is possible that for some designs, these modes may affect portions of memory storage within more than one device, such as a bank within a DRAM/DIMM. In either case, system data processing performance may be compromised if a memory instruction is not correctly executed with optimal timing or precision, as a result of "throttled" or reduced power memory operation when access is requested by the CPU.

Although the techniques described above have been utilized in relation to DRAM/DIMM memory in which power savings are accomplished by "throttling" memory operation or by omitting the refreshing of rows of unused memory areas, the concept of tracking use of memory areas can potentially be applied in other ways to reduce power consumption in accordance with the present invention. For example as described above, certain types of memory devices might have "throttling" capability or built-in reduced power modes in which less power is consumed at the expense of greater access latency. By identifying and accessing underutilized portions of memory, it is possible to accomplish a reduction in power consumption in a novel manner that lessens the detrimental effects of such "throttling" or reduced power modes. Specifically, it is possible to utilize the above-described concepts of tracking memory area usage in order to redistribute memory allocation to portions of DRAM/DIMM devices in which no (or relatively little) memory is currently in use, so as to balance memory usage more evenly in a way that reduces power consumption while minimizing "throttling" or operation at reduced power, thereby overcoming these disadvantages of the prior art techniques of accomplishing memory power management.

Specifically, the concepts introduced with reference to FIGS. 3 & 4 can be used advantageously with DRAM/DIMM memory devices in order to redistribute memory allocation more evenly to accomplish a reduction in power consumption. By utilizing these techniques, the OS 18 can instruct CPU 12 to use memory controller 14 to identify currently used and unused areas of memory based on whether the flags of use registers 24 are set. Similarly, the OS 18 can instruct CPU 12 to use memory controller 14 to monitor memory usage so as to identify areas of memory that are accessed most frequently (or most recently) based on whether the flags of recent-access registers 36 are set. In this way, the memory controller first identifies and targets areas of memory for redistribution based on usage.

Alternately, as described and incorporated herein by reference to U.S. Patent Application Publication No. 2003/0174559, the present invention can include a means for monitoring DRAM/DIMM power consumption by storing a temperature threshold in memory, which includes measuring operating parameters of the DRAM/DIMM component versus temperature, calculating a maximum acceptable operating temperature at which the DRAM/DIMM performance exceeds predetermined specifications, and storing parameters corresponding to this temperature threshold in a nonvolatile memory preferably formed from fusable devices in a comparison circuit. These stored parameters can then be used to modify DRAM/DIMM operation in response to temperature, by periodically measuring the actual operating temperature of the memory location and comparing the measured operating temperature to the stored temperature threshold. This measurement technique can be used with any of the methods described above for reducing memory power consumption when the measured operating temperature exceeds the temperature threshold for the affected DRAM/DIMM component.

The results of any of the above-described techniques of identifying memory usage and/or power consumption can then be utilized in the present invention, by redistributing memory allocation more evenly among memory devices in order to limit the amount of power (and thus the thermal load) consumed by an individual DRAM/DIMM component. Specifically, the present invention dynamically redistributes the active memory address space to prevent any DRAM/DIMM memory component from holding a disproportionate share of the stored data or instructions currently in use, by moving part of the memory contents into a spare region of memory. This is accomplished by requiring the CPU 12, OS 18, computer basic input-output system (BIOS) and/or memory system 14 & 16 to hold a region of active memory storage in reserve that will not be allocated to the OS, either by retaining a spare memory component 16 or by not fully utilizing an active memory component. By operating the CPU 12, OS 18 and/or memory controller 14 in such a way as to track memory usage, power and/or thermal loads for each memory component 16, the memory controller can redistribute or reallocate a portion of the memory contents by copying (or "writing") it into a free or reserved section of memory using commonly known programming techniques. These contents can subsequently be accessed from the new memory location if the memory activity is unbalanced and/or if a single memory component sustains a disproportionate share of the power or thermal load over a period of time, thus balancing the workload and lowering the peak thermal profile. Preferably, the reserve memory can be "hidden" (or made transparent in its operation) from the OS 18 and/or CPU 12 such that substantially all management and "remapping" of the reserve memory is handled by memory controller(s) 14.

Traditional methods of "throttling" or reduced power memory operation can be briefly applied until the redistribution has occurred, and each active DRAM/DIMM component can have a region of memory reserved for this purpose. For systems with spare memory, the reallocated address space can be redistributed back to the remaining functional components if one or more of the memory components becomes faulty, and the system can revert to "throttling" or reduced power operation if necessary until the faulty component is repaired or replaced. Thus, the present invention is applicable to a memory power management system with multiple DRAM/DIMM components in a channel and also to systems with spare components.

It is recognized that the above-described techniques can in many cases be implemented alternatively in software, hardware, or a combination of both. In the case of software, an implementation might comprise one or more computer-readable storage media containing instructions and instruction sequences that are executable by a computer processor to perform the actions and techniques described above. In the case of hardware, the same or similar actions might be implemented as non-instruction-based logic components embodied on a hardware substrate such as a circuit board or silicon chip.

The techniques described above can be used in many systems to produce significant power savings. Furthermore, such power savings will often have few or no detrimental side-effects, because the power-saving measures are taken with respect to memory areas that are not actually being used or that are being used relatively lightly. The described techniques can therefore avoid or greatly diminish the prior art tradeoff between access speed and power savings.

While certain preferred features of the invention have been shown by way of illustration, many modifications and changes can be made that fall within the true spirit of the invention as embodied in the following claims, which are to be interpreted as broadly as the law permits to cover the full scope of the invention, including all equivalents thereto.

What is claimed is:

1. A computer memory device configured for dynamic redistribution of at least some of its contents to reduce power consumption, comprising:
   (a). at least one active memory storage region;
   (b). at least one active region of memory storage that is held in reserve and not allocated for use; and
   (c). one or more control components each configured to perform at least one of the following operations:
      (i). monitoring operating parameter(s) comprising memory usage, power consumption, or thermal loads for each active memory storage region to identify any memory region meeting the following criteria:
         (A). processing activity for that memory region is unbalanced in comparison to any other memory region; and
         (B). that memory region sustains a disproportionate share of the memory usage, power consumption or thermal load in comparison to any other memory region over a defined period of time;
      (ii). redistributing or reallocating at least a portion of contents of any memory region meeting the aforementioned criteria into a reserve memory location;
      (iii). accessing the redistributed or reallocated contents from the reserve memory location; and
      (iv). repeating the foregoing operations until at least one of the monitored operating parameter(s) is balanced among all active memory components.

2. The computer memory device of claim 1, comprising one or more control components each configured to perform at least one of the following operations:
   (a). controlling or throttling periodicity of memory operation by:
      (i). monitoring data processing performance of at least one memory region from one time segment to another; and
      (ii). deactivating at least a portion of a monitored memory region for a next time segment if the monitored memory processes will be inactive during that time segment; or
   (b). operating at least one memory region at reduced power until memory redistribution has occurred.

3. The computer memory device of claim 2, comprising one or more control components each configured to perform at least one of the following operations for managing a faulty memory region:
   (a). redistributing the contents of a faulty memory region to at least one functional memory region until the faulty memory region is repaired or replaced;
   (b). throttling the performance of at least one memory region until the faulty memory region is repaired or replaced; or
   (c). operating at least one memory region at reduced power until the faulty memory region is repaired or replaced.

4. The computer memory device of claim 1, wherein at least one memory region comprises at least one dynamic random access memory (DRAM) component.

5. The computer memory device of claim 4, wherein at least one of the dynamic random access memory (DRAM) components is configured into at least one dual inline memory module (DIMM) component.

6. The computer memory device of claim 1, wherein the reserve memory comprises at least one memory region that is in an unused state or at least one memory region that is not fully utilized.

7. The computer memory device of claim 1, comprising one or more control components each configured to perform at least one of the following operations for monitoring usage of a memory location:
  (a). identifying an operating parameter associated with the monitored memory location to determine whether that location is currently in use; or
  (b). identifying an operating parameter associated with the monitored memory location to determine whether that location has recently been accessed.

8. The computer memory device of claim 7 wherein:
  (a). a monitored memory location is currently in use when a flag of its use register is set or
  (b). a monitored memory location is currently unused when a flag of its use register is not set.

9. The computer memory device of claim 7 wherein:
  (a). a monitored memory location has been recently accessed when a flag of its recent-access register is set; or
  (b). a monitored memory location has not been recently accessed when a flag of its recent-access register is not set.

10. The computer memory device of claim 1, comprising one or more control components each configured to perform the following operations for monitoring memory power consumption or thermal loads:
  (a). measuring operating parameters of the monitored memory region versus temperature;
  (b). calculating a maximum acceptable operating temperature at which performance of the monitored memory region exceeds predetermined specifications;
  (c). storing parameters corresponding to a calculated maximum acceptable operating temperature threshold in memory;
  (d). periodically measuring or calculating an actual operating temperature of the monitored memory region; and
  (e). comparing the actual or calculated operating temperature to the stored maximum acceptable operating temperature threshold.

11. The computer memory device of claim 10, comprising one or more control components configured to reduce power consumption for the monitored memory region when the actual or calculated operating temperature exceeds the maximum acceptable operating temperature threshold.

12. The computer memory device of claim 11, comprising one or more control components each configured to perform at least one of the following operations for reducing power consumption for the monitored memory region:
  (a). redistributing at least a portion of the contents of the monitored memory region to at least one other memory region;
  (b). throttling performance of the monitored memory region; or
  (c). operating the monitored memory region at reduced power.

13. The computer memory device of claim 11, wherein power consumption for the monitored memory region is restored when the actual or calculated operating temperature no longer exceeds the maximum acceptable operating temperature threshold.

14. The computer memory device of claim 10, wherein at least one of the measurement, calculation, storage and comparison operations are performed using a comparison circuit.

15. The computer memory device of claim 14, wherein the calculated maximum acceptable operating temperature threshold is stored in nonvolatile memory formed from fusable devices in a comparison circuit.

16. The computer memory device of claim 1, wherein the operations are performed by one or more of the following components:
  (a). at least one computer software component each comprising one or more instructions or instruction sequences that are contained in at least one computer-readable storage media and executed by one or more computer processing units; or
  (b). at least one hardware component comprising one or more logic circuits.

17. The computer memory device of claim 1, wherein the reserve memory is hidden from an operating system or processing unit such that substantially all management and redistribution or reallocation of the reserve memory is performed by a memory controller.

18. A computer system configured for dynamic redistribution of computer memory to reduce power consumption, comprising:
  (a). a processing system comprising one or more processing units each controlled by at least one operating system to process data and instructions and to access memory;
  (b). a memory system comprising one or more memory controllers each operated by at least one processing unit to access one or more active memory storage components;
  (c). an active region of memory storage that is held in reserve and not allocated for use; and
  (d). one or more control components each configured for use by at least one processing unit, operating system or memory controller acting in any combination to perform one or more of the following operations:
    (i). monitoring operating parameter(s) comprising memory usage, power consumption, or thermal loads for each storage region of an active memory component to identify any memory component meeting the following criteria:
      (A). processing activity for that memory component is unbalanced in comparison to any other memory component; and
      (B). that memory component sustains a disproportionate share of the memory usage, power consumption or thermal load in comparison to any other memory component over a defined period of time;
    (ii). redistributing or reallocating at least a portion of contents of any memory component meeting the aforementioned criteria into a reserve memory location;
    (iii). accessing the redistributed or reallocated contents from the reserve memory location; and
    (iv). repeating the foregoing operations until at least one of the monitored operating parameter(s) is balanced among all active memory components.

19. The computer system of claim 18, comprising one or more control components each configured to perform at least one of the following operations:

(a). controlling or throttling periodicity of memory operation by:
  (i). monitoring data processing performance of the processing system and at least one memory component from one time segment to another; and
  (ii). deactivating at least a portion of a monitored memory component for a next time segment if the processing system or the monitored memory processes will be inactive during that time segment; or
(b). operating at least one memory component at reduced power until memory redistribution has occurred.

20. The computer system of claim 19, comprising one or more control components each configured to perform at least one of the following operations for managing a faulty memory component:
  (a). redistributing the contents of a faulty memory component to at least one functional memory component until the faulty memory component is repaired or replaced;
  (b). throttling the performance of the processing unit or at least one memory component until the faulty memory component is repaired or replaced; or
  (c). operating at least one memory component at reduced power until the faulty memory component is repaired or replaced.

21. The computer system of claim 18, wherein at least one memory component comprises at least one dynamic random access memory (DRAM) component.

22. The computer system of claim 21, wherein at least one of the dynamic random access memory (DRAM) components is configured into at least one dual inline memory module (DIMM) component.

23. The computer system of claim 18, wherein the reserve memory comprises at least one memory component that is in an unused state or at least one memory component that is not fully utilized.

24. The computer system of claim 18, comprising one or more control components each configured to perform at least one of the following operations for monitoring usage of a memory location:
  (a). identifying an operating parameter associated with the monitored memory location to determine whether that location is currently in use; or
  (b). identifying an operating parameter associated with the monitored memory location to determine whether that location has recently been accessed.

25. The computer system of claim 24 wherein:
  (a). a monitored memory location is currently in use when a flag of its use register is set or
  (b). a monitored memory location is currently unused when a flag of its use register is not set.

26. The computer system of claim 24 wherein:
  (a). a monitored memory location has been recently accessed when a flag of its recent-access register is set; or
  (b). a monitored memory location has not been recently accessed when a flag of its recent-access register is not set.

27. The computer system of claim 18, comprising one or more control components each configured to perform the following operations for monitoring memory power consumption or thermal loads:
  (a). measuring operating parameters of the monitored memory component versus temperature;
  (b). calculating a maximum acceptable operating temperature at which performance of the monitored memory component exceeds predetermined specifications
  (c). storing parameters corresponding to a calculated maximum acceptable operating temperature threshold in memory;
  (d). periodically measuring or calculating an actual operating temperature of the monitored memory component; and
  (e). comparing the actual or calculated operating temperature to the stored maximum acceptable operating temperature threshold.

28. The computer system of claim 27, comprising one or more control components configured to reduce power consumption for the monitored memory component when the actual or calculated operating temperature exceeds the maximum acceptable operating temperature threshold.

29. The computer system of claim 28, comprising one or more control components each configured to perform at least one of the following operations for reducing power consumption for the monitored memory region:
  (a). redistributing at least a portion of the contents of the monitored memory component to at least one other memory component;
  (b). throttling performance of the monitored memory component; or
  (c). operating the monitored memory component at reduced power.

30. The computer system of claim 28, wherein power consumption for the monitored memory component is restored when the actual or calculated operating temperature no longer exceeds the maximum acceptable operating temperature threshold.

31. The computer system of claim 27, wherein at least one of the measurement, calculation, storage and comparison operations are performed using a comparison circuit.

32. The computer system of claim 31, wherein the calculated maximum acceptable operating temperature threshold is stored in nonvolatile memory formed from fusable devices in a comparison circuit.

33. The computer system of claim 18, wherein the operations are performed by one or more of the following components:
  (a). at least one computer software component each comprising one or more instructions or instruction sequences that are contained in at least one computer-readable storage media and executed by one or more computer processing units; or
  (b). at least one hardware component comprising one or more logic circuits.

34. The computer system of claim 18, wherein the reserve memory is hidden from an operating system or processing unit such that substantially all management and redistribution or reallocation of the reserve memory is performed by a memory controller.

35. A method for dynamic redistribution of computer memory to reduce power consumption, comprising:
  (a). configuring one or more components comprising at least one processing unit, operating system, or memory controller acting in combination to perform the following operations:
    (i). holding at least one storage region of an active memory component in reserve that is not allocated for use by a memory system;
    (ii). monitoring operating parameter(s) comprising memory usage, power consumption, or thermal loads for each storage region of an active memory component to identify any memory component meeting the following criteria:

(A). processing activity for that memory component is unbalanced in comparison to any other memory component; and
(B). that memory component sustains a disproportionate share of the memory usage, power consumption or thermal load in comparison to any other memory component over a defined period of time;

(iii). redistributing or reallocating at least a portion of memory contents into a reserve memory location for any memory component meeting of the aforementioned criteria; and (iv). accessing the redistributed or reallocated contents from the reserve memory location; and (b). repeating the foregoing steps until at least one of the monitored operating parameter(s) is balanced among all active memory components.

\* \* \* \* \*